Sept. 3, 1963 R. E. STAEHLER 3,102,998
STORAGE SYSTEM
Filed June 5, 1959
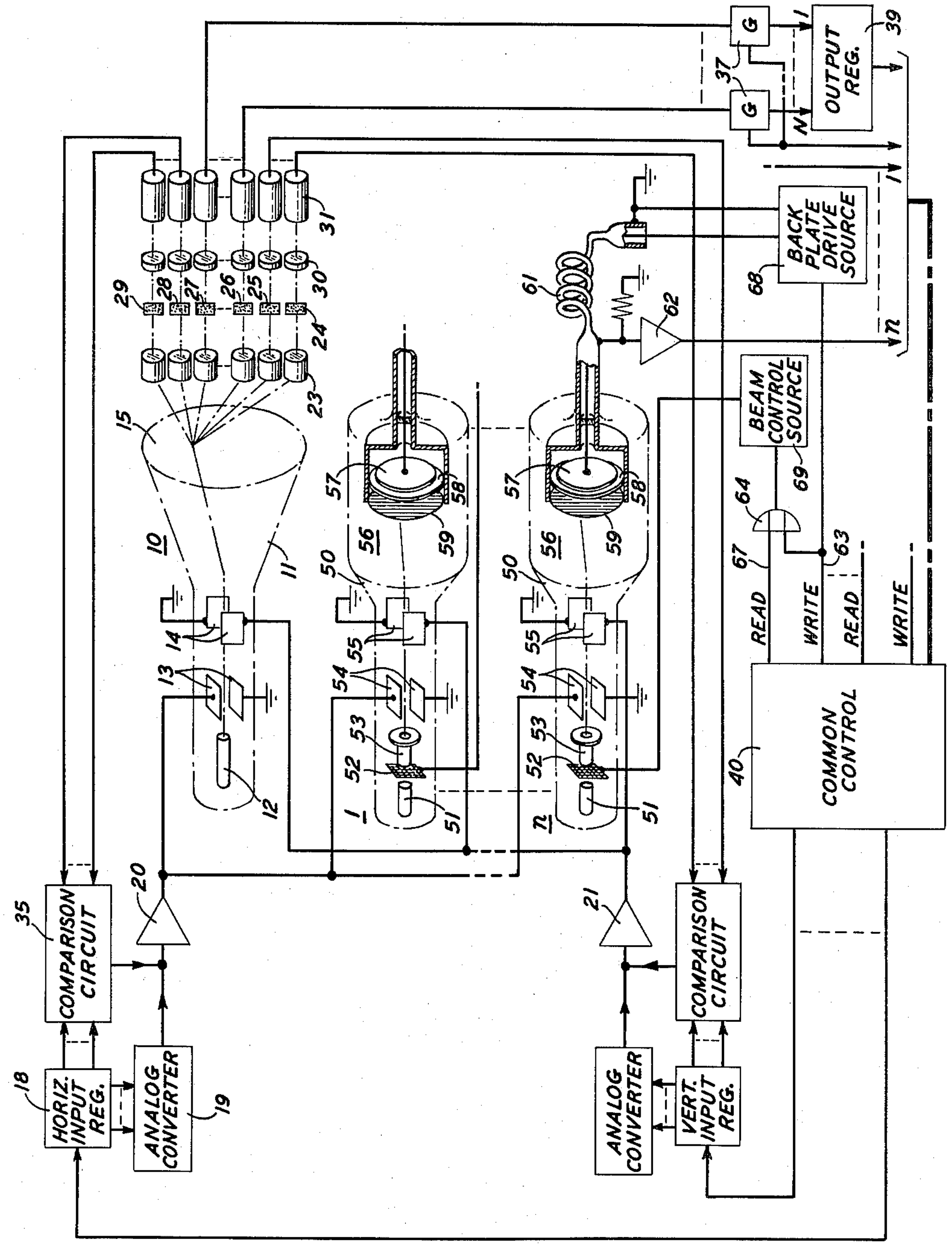
INVENTOR
R. E. STAEHLER
BY
R. C. Winter
ATTORNEY 3,102,998
STORAGE SYSTEM
Robert E. Staehler, North Caldwell, N.J., assignor to Bell Telephone Laboratories, Incorporated, New York, N.Y., a corporation of New York
Filed June 5, 1959, Ser. No. 818,410
7 Claims. (Cl. 340—173)

This invention relates to information storage systems and more particularly to systems for temporary and relatively permanent storage of large quantities of information.

Various applications, including telephone communication systems and computers in general, require the storage of a large quantity of information, a portion of which is changed at frequent intervals and the balance of which is rarely changed.

The relatively permanent storage of large amounts of information may be accomplished by employment of a system termed the Flying Spot Store, as disclosed in Patent 2,830,285, issued to R. C. Davis and myself on April 8, 1958, and in an article entitled "Fundamental Concepts in the Design of the Flying Spot Store," by C. W. Hoover, Jr., R. E. Staehler, and R. W. Ketchledge, appearing in the Bell System Technical Journal, vol. 37, No. 5, September 1958, pages 1161–1194. In this system information is stored on minute, discrete areas of a storage surface such as a photographic slide. Light emanating from the luminescent surface of a cathode ray tube, due to selective deflection of an electron beam to impinge a particular position on the tube surface, is focused on a desired discrete area of the slide. The response from photocells positioned to receive light from the screen through the slide indicates the information stored at the selected discrete area.

The principal difficulty encountered in such a system, which is overcome in accordance with the cited Davis et al. patent, is rapid and accurate access to and readout of information from a highly concentrated information storage surface. Such operation necessarily requires employment of precise and reliable initial access and beam deflection correction circuitry.

Temporary information storage may be accomplished by employment of any of a variety of storage devices including the barrier grid storage tube of the type disclosed, for example, in M. E. Hines Patent 2,844,722, issued July 22, 1958. In the barrier grid tube, information is stored as discrete areas of charge at a dielectric target and is destroyed in the readout process which includes deflecting an electron beam to impinge the selected storage area. Again, rapid and accurate access to the storage area is of paramount importance. Beam positioning circuitry, such as that disclosed in C. F. Ault application Serial No. 631,554, filed December 31, 1956, now Patent No. 2,904,721, issued September 15, 1959, is required to assure continued accuracy of information storage and readout in the event that the input address circuitry fails to maintain exact beam positioning for relatively long periods of time.

Thus a system utilizing both temporary and permanent storage units, such as the telephone system disclosed, for example, in Budlong-Drew-Harr patent application Serial No. 688,386, filed October 7, 1957, now Patent No. 2,955,165, issued October 4, 1960, demands access and error correction circuitry for each type of storage unit. Independent circuitry for each component, as disclosed in the Budlong et al. patent, necessarily increases system initial cost, and in relatively small operations, such as a telephone office serving on the order of 1000 subscriber lines, this expense is a considerable factor in determining adoption of such a system.

It is an object of this invention to provide an improved information storage system.

It is another object of this invention to provide an improved combined temporary and permanent information storage system with a minimum of ancillary components.

It is a further object of this invention to realize precise monitoring of the electron beam in the reading operation of the temporary information storage unit and to improve the speed and accuracy of beam position or deflection error correction.

It is a still further object of this invention to provide an economical time-shared temporary and permanent information storage system.

These and other objects of my invention are attained in accordance with one specific illustrative embodiment thereof by a unique system arrangement and manner of operation which permit the compatible combination of access and beam deflection correction circuitry for the temporary and semi-permanent storage units. Hereinafter, an electron beam storage unit such as the Flying Spot Store, which is designed to provide semi-permanent information storage, will be referred to as the permanent store and reference to the temporary store will connote electron beam storage units designed to permit frequent change of stored information, such as the barrier grid tube store.

Generally speaking, the beam deflection circuitry utilided in initial access to particular information in the permanent store is comparable to that employed in initial access to information in the temporary store. In addition, the problems encountered in assuring accurate positioning of the electron beam so as to impinge a desired discrete information storage area, are closely related in permanent and temporary stores. In each instance, elements are provided which determine whether or not the position of an electron beam in relation to a fixed target surface is proper. The resultant of such a determination is applied to the deflection circuitry so as to reposition the electron beam.

In accordance with this embodiment of my invention, initial beam deflection circuitry is connected in common to the temporary and permanent stores so as to deflect the electron beams in both stores simultaneously. In addition, the beam deflection correction circuitry for the permanent store is connected so as to perform the necessary positioning operation in the temporary store as well. In this fashion, the need for complex and costly independent beam positioning circuitry for the temporary store is obviated.

In accordance with one aspect of this embodiment of my invention, the flexibility of the system is increased by time-sharing the use of the temporary and permanent stores. Such a time-sharing is facilitated by properly synchronized programing of the address and output circuitry in the temporary and permanent stores.

It is, therefore, a feature of this invention that a combined temporary and permanent information storage system have a common initial information address system.

It is a more specific feature in accordance with one embodiment of this invention that the temporary and permanent stores each comprise an electron discharge device and a common beam deflection control system.

It is another feature of this invention that a combined temporary and permanent information storage system contain a common beam position or deflection error correction system.

More specifically, it is a feature of this invention that the error correction system comprise means for detecting the position of the electron beam in the permanent store and means for comparing information as to the detected beam position with the initial beam positioning information and applying the resultant of such comparison to the common beam deflection control circuitry.

It is a further feature of this invention that input information be applied to the permanent and temporary stores concurrently and that information be derived from each type of store alternatively in accordance with the particular store to which the input information is directed.

A complete understanding of my invention and of these and other features thereof may be gained from consideration of the following detailed description and the accompanying drawing, the sole FIGURE of which is a system representation, mainly in block diagram form, of one specific illustrative embodiment of this invention.

As depicted in the drawing, the system contains a permanent store and a temporary store, the operations of which are directed by a common control 40. The common control 40 is a universal information processing center, the operation of which is disclosed, for example, in the aforementioned Budlong et al. patent. Under orders from the permanent store, the common control 40 serves to process, on a time division basis, all of the actions necessary to the operation of a complex switching system such as a telephone system. Signals from the common control 40 serve to address the permanent store to locate and read out desired information. Such information is returned to common control and serves to direct its subsequent actions.

Included in this information are orders for operation of the temporary store. The signals from the common control to the temporary store include an address and an order. The address locates the desired stored information, and the order indicates the action to be taken at the addressed storage location. In response to receipt of signals, the temporary store indicates to common control 40 the state of the addressed location, whereupon common control 40, pursuant to orders, directs the revision or regeneration of the priorly stored information.

The permanent store, as described in detail in the aforementioned Davis et al. patent, includes a cathode ray tube, shown generally at 10, comprising an evacuated enclosing vessel 11 having at one end an electron gun 12. The electron gun 12 produces a concentrated electron beam which is projected centrally between two pairs of deflection plates 13 and 14, mounted in space quadrature.

The electron beam is projected against a target surface 15 which forms the face of the cathode ray tube 10 and is coated with a luminescent material. The deflection plates 13 and 14, which are energized from horizontal and vertical deflection circuits through amplifiers 20 and 21, respectively, serve to deflect the electron beam to a desired discrete area of surface 15. The horizontal deflection circuitry is identical to the circuitry for vertical deflection, so that a description of the horizontal circuitry will suffice to describe the structure and operation of this specific embodiment of my invention.

An input address comprising, in this specific embodiment, groups of signals representing digits of a conventional binary number code, are applied in parallel form to the horizontal input register 18 which may comprise a series of bistable flip-flop units, as known in the art, arranged to provide corresponding inputs to the comparison circuit 35 and the analog converter 19. Such input circuitry is indicated in the aforementioned Davis et al. patent. Each signal in the group of input signals is converted into an analog representation of a binary digit in the analog converter 19, and the summation of the analog representations is amplified by summing amplifier 20 and applied to the horizontal deflection plates 13. Each discrete potential applied between deflection plates 13 is intended to deflect the electron beam to impinge an area of the screen 15 corresponding to the horizontal input address.

The electron beam produces a spot of light at the discrete area of the luminescent surface 15 to which it is directed by the input address. An appropriate lens system 23 is positioned behind the surface 15 so as to focus the resultant light on a plurality of slides such as 24 through 29. Any number and arrangement of slides may be utilized so long as it is consistent with focusing requirements and output connections from appropriate light detection means associated with the slides. The slides contain binary information stored at discrete areas thereof which is identified by distinct light transmission characteristics.

With the light beam focused on a discrete location of each of the slides 24–29 indicated in the drawing, light passing through these discrete locations will be focused by converging lenses 30 upon appropriate light sensitive devices 31 individual to each of the slides. The latter devices may each comprise a phototube and amplifier arrangement as known in the art. Light received by certain of the devices 31 is transformed into electrical impulses which are delivered to the output circuitry. Such output circuitry may comprise logic gates 37 selectively controlled by the input circuitry to store information in output storage means such as output register 39.

Others of the devices 31 transmit impulses to repositioning circuitry for both the permanent and temporary stores. Thus information taken from permanent store deflection error detection slides, such as 28 and 29, is utilized to reposition the electron beam in the permanent store and in each of the temporary stores, as described hereinafter. Information from the deflection error detection slides 28 and 29 is transmitted to the comparison circuit 35. The comparison circuit, an example of which is disclosed in the aforementioned Davis et al. patent, compares the binary coded information thus received with the binary coded information from the horizontal input register 18 which served initially to deflect the electron beam of the cathode ray tube 10. The comparison resultant, if any, is transmitted to the horizontal deflection plates 13 through the summing amplifier 20.

Such corrective action continues until the resultant of the operation conducted in the comparison circuit is zero. After sufficient time has elapsed to assure completion of such corrective action, output gates such as 37 are enabled by common control 40 to permit information stored on the slides, such as 26 and 27, to be transmitted through appropriate output circuitry to the common control 40. The output gates 37 are also controlled in conjunction with control of the input address information such that output information will be derived from the permanent store only upon receipt of pertinent address information by the permanent store.

The temporary store in this specific illustrative embodiment of my invention consists of one or more barrier grid tubes such as tube 50. The barrier grid tube structure is well known in the art, as disclosed, for example, in the aforementioned Hines patent. The tube 50 advantageously may comprise within an evacuated envelope an electron gun 51, a beam blanking electrode 52, appropriate accelerating and focusing electrodes defining an electron lens 53, deflection plates 54 and 55, mounted in space quadrature, and a target assembly 56. The target assembly 56 includes a backplate 57, a dielectric sheet 58, and a barrier grid 59.

In destructive readout storage devices of this type, information is stored or written by an electrostatic charge on a discrete area of the surface of the dielectric 58. Such a charge may be placed on the surface by deflection of the electron beam to the desired discrete area, while the backplate 57 is temporarily raised to a positive potential. This temporarily raises the potential of the front face of the dielectric through capacitive action. The electron beam then charges this surface with negative electrons sufficient to drop its potential to that of the barrier grid 59, which is the equilibrium potential. When the beam is turned elsewhere and the backplate potential returned to normal, the charge remains on the discrete area, leaving that portion of the dielectric surface at a negative potential.

The information thus stored or written in this discrete area on the surface of the dielectric 58 may be read out subsequently by returning the electron beam to this discrete area. The beam, in striking the dielectric, releases more secondary electrons from the surface than there are primary electrons striking it, and these secondary electrons are repelled from the surface, causing the potential at the discrete area to rise to that of the barrier grid. At equilibrium, the dielectric surface releases as many electrons as arrive and remains at the barrier grid potential. Thus, when information is being read out, the surface of the dielectric is being discharged, thereby providing a destructive readout, temporary storage operation.

It should be appreciated that any inaccuracies existing in the positioning of the electron beam on a particular discrete area of the target surface from which it is desired to obtain information, would destroy the accuracy of information read out of the temporary store. As the components present in the input address circuitry are numerous and complex, such inaccuracies often may be encountered. It is essential, therefore, that a positioning system which prevents the occurrence of such inaccuracies be provided.

The structure of the barrier grid tube and its destructive readout operation are not compatible with a self contained, beam deflection correction scheme, as employed in the permanent store. Rather, beam deflection correction schemes for temporary stores, as known in the art and as disclosed, for example, in the aforementioned Ault patent, involve the use of additional cathode ray tubes and associated circuitry, which serve solely as the positioning system for the corresponding temporary storage tubes.

In accordance with my invention, the need for individual temporary store positioning circuitry is obviated by the combination of the temporary store with the permanent store such that the permanent store itself serves as the positioning system for the temporary store. Thus the interconnection of the beam deflection systems for the permanent store and the temporary store permits the application of beam deflection correction signals, as developed in the permanent store, for deflection correction of the electron beam in the temporary store.

In conjunction with such an interconnection of deflection systems for the permanent and temporary stores, access to the stores and readout of information therefrom, advantageously may be programed in common control 40 so as to operate on a time division basis. Thus the stores may be interrogated alternatively, dependent upon the particular operation that the system is required to implement. Consider, for example, that a particular operation requires frequent access to information in the permanent store and only occasional access to the information in the temporary store. In this instance, the information applied to the input registers such as 18 most frequently would be directed to readout of information from the permanent store. Coordinated with the application of such input address information would be the operation of the output gates such as 37 so as to assure proper readout solely from the permanent store.

The electron beams in the temporary store are likewise positioned by the information inserted to position the beam in the permanent store. However, the control circuitry may be programed such that particular circuitry designed for readout from the temporary store will not be enabled at this time.

Peculiar to the operation of the barrier grid tube illustrated as the temporary store in this embodiment of the invention, is the fact that destruction of the information stored at its target surface results only from positioning of the electron beam on a discrete area of the target member during a reading operation. The system advantageously may be programed such that during an interval assigned to readout from the permanent store, the electron beam in the temporary store is blanked. Thus absense of an electron beam in the barrier grid tube during readout from the permanent store assures that the information stored in the barrier grid tube is not destroyed.

Considering, now, the operation involving readout from the temporary store, the information applied to the input registers 18 is directed toward deflection of the electron beams in the barrier grid tubes. The beam in the permanent store is of course deflected in similar manner due to the parallel connected deflection systems, but the programing is such that the permanent store output gates 37 are not enabled at this time and thus no readout from the permanent store is provided. Contrarily, the output circuitry for the temporary store is energized coincident with the positioning of the beam in each tube on the discrete area of the target surface from which it is desired to obtain information.

One type of readout operation in the barrier grid tube is referred to as "backplate reading" and is illustrated in the drawing and described in detail in the aforementioned Hines patent. Briefly, the circuitry for accomplishing backplate reading in each tube 50 comprises a coaxial line having the inner conductor connected to the backplate 57 and the outer conductor connected to the barrier grid 59. A coiled portion 61 of the coaxial line advantageously acts as a noninductive winding in the presence of backplate charging current, which current is applied from a source 68 connected between the inner and outer conductors of the coaxial line. An output signal, indicated by current flow in the same direction in both of the coaxial line conductors, encounters a high impedance in the inductive winding 61, and the ensuing voltage drop is registered in an output circuit through output amplifier 62.

Considering, now, the particular operation of the temporary store in the instant system, a signal from the common control 40 on the WRITE input order lead 63 for the corresponding barrier grid tube 50 is applied through gate 64 to beam control source 69. A bias potential normally is applied to the grid 52 in each tube 50 to blank the corresponding beam. Thus the signal on lead 63 to the source 69 serves to inhibit the application of the beam blanking potential from the source 69. The result is the focusing of the electron beam on the selected discrete area of the dielectric 58 at which information is to be written. Simultaneously, the signal on WRITE lead 63 is applied to backplate drive source 68 to permit the application of a signal from source 68 through the inductance 61 to charge the backplate 57 to a positive potential. An output signal may be developed during the writing operation but such a signal would be relatively small in relation to a proper readout signal, such that appropriate output circuitry would readily distinguish between them.

With the proper information written in the selected discrete area, the electron beam in the selected temporary store is removed and is only returned to this particular discrete area when it is desired to read out the stored information. Considering that at some later time such readout is desired, the common control 40 will provide an input address which will serve to deflect the electron beams in each of the permanent and temporary storage devices to the particular position corresponding to the desired discrete area in the selected barrier grid tube 50. Simulatneously, a signal is applied to the READ input order lead 67. This signal is directed through gate 64 and serves to unblank the beam in the selected tube 50. The signal on the READ lead, however, does not permit alteration of the backplate potential. The ensuing current flow in the coaxial line of the selected tube 50 will produce the desired output signal through the amplifier 62. Upon readout of the information, the discrete area of the target surface no longer contains the information, and it is necessary to rewrite the information at the discrete area or to write in new information as desired. The common control 40 provides for such a cyclic operation in which a reading operation is followed by a writing operation at the same discrete area prior to the next reading operation.

The speed of system operation may be set according to the requirements of each type of store. This is possible in that alternative operations are performed, and the speed for each operation may be unique to the particular store being interrogated.

The capacity of the store may be varied to suit the requirements of any particular operation. Thus, if more permanent information storage is required, an increase in the information storage slides such as 26 and 27, with a corresponding increase in light sensitive devices 30 and output gates 37, is all that need be provided. Similarly, if additional temporary information storage is desired, additional barrier grid tubes may be included in the system, which tubes will have their deflection systems tied in with the balance of the system, in the manner shown in the drawing.

Thus, considering N permanent information channels and *n* additional temporary information channels, and considering $256 \times 256$ or 65,000 possible beam deflection address positions in the permanent store, and $128 \times 128$ or 16,000 possible addresses in each tube of the temporary store, the total capacity of the system would be $65N \times 10^3$ bits of permanent information and $16n \times 10^3$ bits of temporary information.

Another aspect of this embodiment of my invention worthy of consideration here is the ready adaptability of the system to interrelated information storage. The permanent store inherently requires actual replacement of information storage slides when it is necessary to alter a portion or all of its content. Since the purpose of such a store is to develop information requiring relatively infrequent change, such a replacement is not a great burden, but it nevertheless exists. This burden may be reduced by permitting the temporary store to operate concurrently with the permanent store to provide a small portion of the otherwise permanent information.

The circuitry indicated in the drawing is readily adaptable to such operation by permitting concurrent enablement of the output circuitry in both stores and use of the output information in proper sequence. Thus the permanent store may be processed to store that portion of the information which is essentially permanent, and the few bits of a message which may require change over a period of time are stored in the temporary store where the change is readily implemented when required. The system is then operated so as to provide concurrent readout from each type of store. Since the temporary store would be required to store only a few bits of the otherwise permanently stored message, the respective large and small storage capacities of the permanent and temporary stores are utilized to optimum advantage.

It is to be understood that the above-described arrangements are illustrative of the application of the principles of the invention. Numerous other arrangements may be devised by those skilled in the art without departing from the spirit and scope of the invention.

What is claimed is:

1. An information storage system comprising a permanent store including a cathode ray tube having a luminescent surface, means for projecting an electron beam against said surface to produce a spot of light thereat, first beam deflection means, an information storage medium, and light sensitive means positioned to receive light from said surface through said storage medium, a temporary store comprising a cathode ray tube having an information storage target, means for projecting an electron beam against said target, second beam deflection means and means for detecting output signals from said target, access circuitry connected in common to each of said stores, means for applying input information to said access circuitry to initiate concurrent operation of each of said stores, distinct output circuitry connected to each corresponding store, and means for enabling said permanent and temporary stores alternatively.

2. An information storage system in accordance with claim 1 wherein said access circuitry comprises input information register means and comparison circuit means connected between said register means and said first and second beam deflection means.

3. An information storage system in accordance with claim 2 and further comprising beam deflection correction means positioned to receive light from said cathode ray tube surface through said information storage medium, and means for applying electrical signals from said beam deflection correction means to said comparison circuit means.

4. An information storage system in accordance with claim 3 and further comprising output circuitry individual to each of said permanent and temporary stores, and means for connecting said output circuitry to said input information applying means for enabling alternatively said temporary and permanent store output circuitry upon deflection of the electron beams in each of said stores to the position specified by said input information.

5. A storage system comprising a first electron discharge device having an information storage target, means for projecting an electron beam against said target, a second electron discharge device having a luminescent surface, means for projecting an electron beam against said surface, a plurality of information storage and error correcting members positioned in front of said luminescent surface, light responsive means for generating electrical signals in response to light transmitted thereto from said luminescent surface through said error correcting members, common means for deflecting concurrently the beams in said first and second electron discharge devices, and means for applying said electrical signals to said common beam deflecting means.

6. A storage system in accordance with claim 5 wherein said common beam deflecting means comprises means for registering input information to address the electron beams in said devices, comparison means connected between said register means and said light responsive means for comparing the electrical signals from said light responsive means with the input information in said register means, and means for applying the comparison resultant from said comparison means in common to the beam deflection elements in said first and second devices.

7. A storage system in accordance with claim 6 and further comprising distinct output means associated with each of said first and second devices, and means for enabling said output means alternatively in accordance with the input information in said register means.

References Cited in the file of this patent

UNITED STATES PATENTS

| | | |
|---|---|---|
| 2,457,911 | Munster | Jan. 4, 1949 |
| 2,702,356 | Flory | Feb. 15, 1955 |
| 2,830,285 | Davis et al. | Apr. 8, 1958 |
| 2,853,695 | Chu | Sept. 23, 1958 |

FOREIGN PATENTS

| | | |
|---|---|---|
| 524,673 | Canada | May 1, 1956 |